Dec. 27, 1949     V. J. SCHAEFER     2,492,768

CLOUD MOISTURE METER

Filed Sept. 18, 1947

Inventor:
Vincent J. Schaefer,
by Gravell S. Mack
His Attorney.

Patented Dec. 27, 1949

2,492,768

UNITED STATES PATENT OFFICE 2,492,768

CLOUD MOISTURE METER

Vincent J. Schaefer, Schenectady, N. Y., assignor to General Electric Company, a corporation of New York Application September 18, 1947, Serial No. 774,727

6 Claims. (Cl. 73—335)

My invention relates to improved apparatus for continuously measuring the amount of suspended liquid in an aerosol, and more particularly to improved apparatus for measuring the liquid water content of clouds.

It is an object of my invention to provide apparatus to continuously measure the liquid water content of clouds.

It is another object of my invention to provide apparatus to measure the amount of suspended liquid in any aerosol.

It is a further object of my invention to provide apparatus for continuously measuring and automatically recording a very small rate of flow of a liquid.

Figure 1:
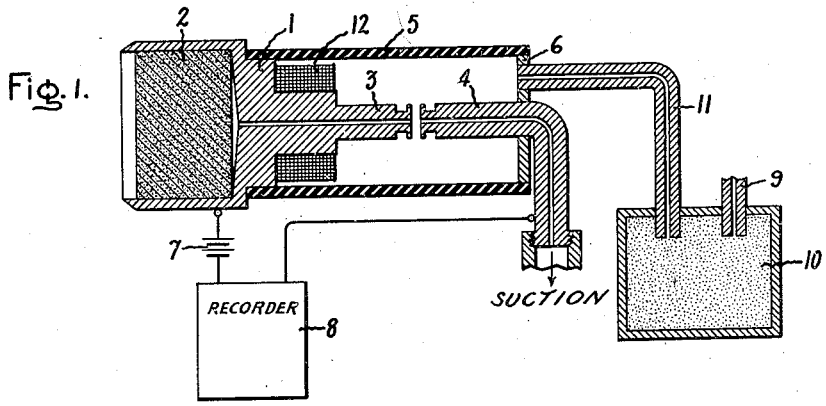
Figure 2:
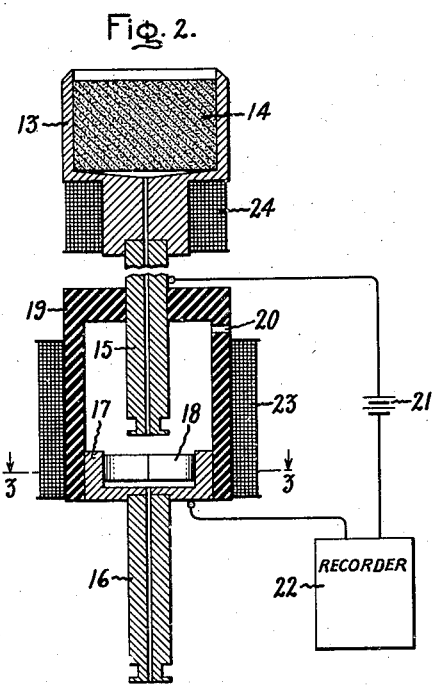
Figure 5:
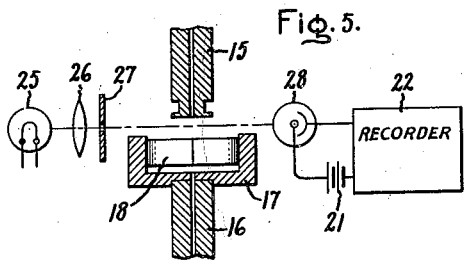
Figure 4:
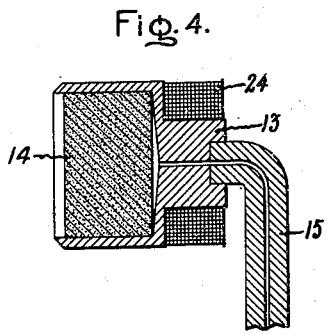
Figure 3:
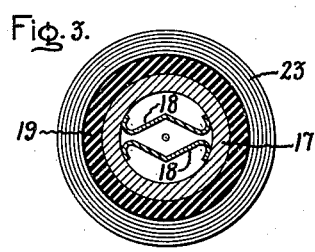

The features of my invention which are believed to be novel and patentable will be pointed out in the claims appended hereto. For a better understanding of my invention reference is made in the following description to the accompanying drawing in which Fig. 1 is a vertical section of one form of my invention; Fig. 2 is a vertical section of another form of my invention; Fig. 3 is a section along the line 3—3, Fig. 2; Fig. 4 is a fragmentary view showing a modification of apparatus shown in Fig. 2; and Fig. 5 is a fragmentary view showing another modification of apparatus shown in Fig. 2.

Refer now to Fig. 1, which shows a form of my invention adapted to be installed on an airplane to measure the liquid water content of the immediately surrounding atmosphere. An annealed copper rod 1 is drilled axially as shown to receive a small cylinder 2 made of porous bronze metal having very fine uniform pores capable of holding a head of 50 to 70 centimeters of water by capillary action. The apparatus is so mounted on the airplane that one end of the porous cylinder is exposed to the cloud to be measured and faces forward in the direction of travel relative to the cloud. As shown in Fig. 1 the direction of travel is from right to left. The porous bronze cylinder collects any liquid water which it intercepts as it passes through a cloud, so that if the exposed area of the cylinder, its velocity, collection efficiency, and the rate of water collection are known, the liquid water content of the immediately surrounding atmosphere can be determined. Velocity may be measured with a Pitot tube, three cup anemometer, or other means known to those skilled in the art. Collection efficiency may be determined by experimental calibration of the apparatus with aerosols having known suspended liquid contents. Or the theoretical collection efficiency may be determined by methods explained in "A Mathematical Investigation of Water Droplet Trajectories," by Langmuir and Blodgett, A. A. F. Technical Report No. 5418 (1946), copies of which may be obtained from Wright Field, Dayton, Ohio.

The left-hand end of rod 1 extends about 1/8 inch beyond the flat surface of cylinder 2 and is tapered to a feather edge as shown. This design sharply limits the area of cloud intercepted by the cylinder and at the same time reduces evaporation losses to a minimum. The other end of rod 1 is fashioned in the form of a tube 3, as shown, having a small capillary bore about 0.03 inch in diameter. A receiving element comprising a tube 4 is placed as shown, and a suction of about 20 centimeters of water is applied thereto at the lower right-hand end. This suction may be obtained from the airplane engine manifold or other convenient source. A sleeve 5 and an end plate 6 enclose an airtight compartment whereby the suction applied to tube 4 is transmitted to tube 3, and thus to the right-hand portion of cylinder 2. This suction is sufficient to drain from cylinder 2 the excess water over the fixed amount held by capillary action, but not to suck air through the cylinder. Thus an amount of water equal to the water collected by cylinder 2 from the surrounding atmosphere is sucked into and passes through tube 3. This water collects at the right-hand end of tube 3 as a droplet which grows in size until it contacts tube 4. When this occurs the suction draws the droplet away from collecting tube 3 and through receiving tube 4, so that as more water collects another droplet forms at the end of tube 3 and the process is repeated.

At the right-hand end of tube 3 and at the left-hand end of tube 4 are reduced sections, leaving a flange about 0.002 inch thick at each end as shown. The outside surfaces of tubes 3 and 4, except for the end faces, are made hydrophobic by a thin coating of high melting point hydrocarbon wax or other suitable material. The end faces of each tube should be in a hydrophilic condition, as will occur without further treatment if the copper surfaces are clean. Thus, water is prevented from climbing up the outside surface of either tube by the thin flanges and the hydrophobic nature of the surfaces. Moreover, as the base of each droplet is limited by the diameter of the flange at the end of tube 3, and as the dimension of the droplet normal to such base is limited by the spacing between tubes 3 and 4, droplets of very uniform size are obtained; and when the apparatus is properly calibrated, the number of droplets formed is an accurate measure of the amount of water collected.

Sleeve 5 is made of an electrically non-conducting material, so that the left-hand and right-hand portions of the apparatus are electrically insulated from each other. These two portions are connected in series as shown with a source of electric voltage 7 and a conventional electric pulse recorder 8, or other electrical counting device. The conductivity of water is sufficiently high that during the brief interval when each droplet bridges the space between tubes 3 and 4 a pulse of electric current flows through the electric circuit. This pulse of electric current is recorded by the recorder 8, which thus provides a record of the number of droplets formed, from which the amount of water collected may be determined if the apparatus has been previously calibrated. A demand meter, pulse counter, or other electrical indicating instrument may be used in place of the pulse recorder without changing the principle of my invention, and telemetering means known to the art can be employed to give an indication at a distance from the measuring apparatus.

To prevent the condensation of moisture on the inner surface of sleeve 5, which might form a leakage path for electric current, dry air is circulated inside the sleeve. This air enters through intake tube 9, passes through a drying agent 10 and tube 11 to the inside of sleeve 5, and is sucked out through tube 4. The drying agent 10 may be calcium chloride or other material suitable for such purpose. To prevent icing in below-freezing temperatures, a portion of rod 1 may be reduced in size as shown, and electrical heating coils 12 wound thereon. These heating coils may be thermostatically controlled to maintain any desired temperature. The use of copper for rod 1 and porous bronze for cylinder 2, both materials having high thermal conductivity, facilitates such heating to control icing, which would be difficult if a low thermal conductivity material such as porous clay were used.

Refer now to Figs. 2 and 3, which show a form of my invention in which no external means of providing a suction is needed. An annealed copper rod 13 is drilled axially as shown to receive a porous bronze cylinder 14, which collects any liquid water which it intercepts as it passes through a cloud. The lower end of rod 13 is connected as shown to a capillary tube 15, which may be a small copper tube having a bore of about 0.03 inch, and a length of about 20 centimeters. Tube 15 extends vertically downward from cylinder 14 so that when this tube is filled with water a suction of about 20 centimeters of water is applied to the lower portion of cylinder 14 by the weight of the head of water contained in the capillary tube. This suction is sufficient to drain the excess water from cylinder 14, but not to suck air through the cylinder. Thus an amount of water equal to the water collected by cylinder 14 from the surrounding atmosphere is sucked into and passes through tube 15, and collects as droplets at the lower end thereof.

As shown in Fig. 2 the apparatus is adapted to be attached to a weather balloon which would travel upward through the cloud to be measured, but the operating principles are not changed if tube 15 is bent at its upper end so that the porous cylinder faces horizontally, as shown in Fig. 4, if the direction of relative travel is to be horizontal. If the apparatus is used at a fixed ground location or aboard a ship, a weather vane or equivalent device may be used to keep the porous cylinder facing into the wind.

Referring to Fig. 2 at the lower end of tube 15 is a reduced section, leaving a flange about 0.002 inch thick at the end as shown. The sides of tube 15 in this region, but not the end face or the bore, are made hydrophobic by a thin coating of high melting point hydrocarbon wax or other suitable material. Thus water is prevented from climbing up the outside surface of the tube by the thin flange and the hydrophobic nature of the surface at the limiting edge of the end face. A receiving element is located directly below tube 15 as shown in Figs. 2 and 3, comprising receiving tube 16, a shallow brass or copper reservoir 17, and two thin strips of copper 18. At the lower end of tube 16 is a reduced section and flange similar to that at the lower end of tube 15. The copper strips 18 are positioned inside of reservoir 17 as shown, so that the two combine to form a diamond-shape when observed from above, as shown in Fig. 3. The end face of tube 15 and the inner surfaces of the receiving tube 16, reservoir 17, and strips 18 are hydrophilic. If these parts are made of brass or copper and the surfaces are clean, such surfaces will be sufficiently hydrophilic without further treatment.

As water collects at the lower end of tube 15 the droplet formed at that point increases in size. When the size of the droplet becomes large enough to contact the thin edges of the copper strips 18 in the reservoir 17, capillary and surface tension forces combined with the surface properties of the tube endings draw the droplet away from tube 15 and into tube 16.

Tube 15 and reservoir 17 are connected together by a bushing 19, which is made of an electrically non-conducting material so that tube 15 and reservoir 17 are electrically insulated from each other. An air vent 20 is provided to equalize the pressures inside and outside of the bushing. Tube 15 and reservoir 17 are connected in series as shown with a source of electric voltage 21 and a conventional electric pulse recorder 22. As each droplet bridges the space between tube 15 and strips 18 the electric circuit is completed, and a pulse of electric current momentarily flows through the circuit. This pulse of electric current is recorded by the recorder 22, which thus provides a record of the number of droplets formed. The apparatus may be calibrated to determine the amount of water collected by observing the number of droplets required to produce a given number of drops at the end of tube 16, and weighing the latter drops. Heating coils 23 may be provided to prevent condensation of water on bushing 19, and heating coils 24 may be added to prevent icing of exposed parts in sub-freezing weather.

Although I have described my invention with reference to the measurement of the liquid water content of air, it is not restricted to such use, but is also adapted for use with other aerosols. For example, it may be used to measure the amount of liquid oil in a suspension of oil in air or other gas. Since almost all liquids have at least a small amount of electrical conductivity and since the space bridged by the liquid droplets formed is very small, sufficient current to drive a sensitive recorder can be obtained in most cases without using excessively high voltages. Furthermore, if the porous bronze plug is initially saturated with oil, it will thereafter be insensitive to water, and if saturated with water it will be insensitive to oil, so that either oil or water content of an aerosol may be measured independently of the other.

In those cases in which the electrical conductivity of the liquid measured is so low that sufficient electric current to drive the recorder cannot be obtained by the means described above, the method of counting droplets illustrated in Fig. 5 may be employed. Droplets of the liquid to be measured are formed and pass from tube 15 to tube 16 as has been hereinbefore explained. A small beam of light from electric lamp 25, focused and restricted in size by a lens 26 and a mask 27, traverses the space immediately below tube 15 and impinges upon a photo-electric tube 28 as shown. As each droplet forms it interrupts this light beam, partially or completely preventing light from reaching photo-electric tube 28, and as the droplet is drawn away from tube 15 into tube 16 the light path is suddenly cleared and remains unobstructed until the next droplet again interrupts the beam. Thus a pulse of light impinges on photocell 28 for each droplet of liquid which passes through the apparatus. The photocell converts this light pulse into an electric signal which in turn drives recorder 22. This droplet-counting method is equally adaptable to the apparatus shown in Fig. 1.

Since my invention meters the flow of liquid through the apparatus, it may be used to measure other small quantities of liquid. For example, the water collected by a rain funnel could be passed through my apparatus to continuously and automatically record the amount of rainfall. For such use the porous bronze cylinder may be omitted.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Apparatus for measuring the liquid water content of clouds comprising a porous metal cylinder adapted to collect any liquid water which it intercepts in passing through a cloud, a capillary tube attached at one end to said cylinder, means to apply a suction to said cylinder through said capillary tube so that excess water is drained from the cylinder and collects as droplets at the opposite end of said capillary tube, a receiving element spaced a fixed distance from the point at which such droplets begin to form, means to draw each such droplet away from said capillary tube when said droplet has attained sufficient size to contact said receiving element so that all such droplets attain a uniform size, and an electric voltage source in series with an electric pulse recorder connected between said capillary tube and said receiving element so that a pulse of electric current flows through said recorder each time a droplet bridges the space between said capillary tube and said receiving element.

2. Apparatus for measuring the amount of suspended liquid in an aerosol comprising a porous element adapted to collect any of the liquid which it intercepts, means including a capillary tube to drain excess liquid from said porous element and to collect such liquid in the form of droplets at one end of said capillary tube, a receiving element spaced a fixed distance from the point at which such droplets begin to form, means to draw each such droplet away from said capillary tube when said droplet has attained sufficient size to contact said receiving element so that all such droplets attain a uniform size, and an electric circuit connected between said capillary tube and said receiving element for establishing a current path so that a pulse of electric current may flow through said circuit each time a droplet bridges the space between said capillary tube and said receiving element.

3. Apparatus for measuring a small flow of a liquid comprising a capillary tube adapted to have the liquid to be measured flow therethrough and collect in the form of droplets at one end thereof, a receiving element spaced a fixed distance from the point at which such droplets begin to form, means to draw each such droplet away from said capillary tube when said droplet has attained sufficient size to contact said receiving element so that all such droplets attain a uniform size, and an electric voltage source in series with an electric indicator connected between said capillary tube and said receiving element so that a pulse of electric current flows through said indicator each time a droplet bridges the space between said capillary tube and said receiving element.

4. Apparatus for measuring the liquid water content of clouds comprising a porous element adapted to collect any liquid water which it intercepts in passing through a cloud, a collecting tube attached at one end to said porous element, means to apply a suction to said porous element through said collecting tube so that excess water is drained from the porous element and collects as droplets at the opposite end of said collecting tube, a receiving element comprising a receiving tube one end of which is spaced a fixed distance from the point at which such droplets begin to form, means to apply a suction through said receiving tube to draw each such droplet away from said collecting tube when said droplet has attained sufficient size to contact said receiving element so that all such droplets attain a uniform size, and an electric voltage source in series with an electric indicator connected betwen said collecting tube and said receiving element so that a pulse of electric current flows through said indicator each time a droplet bridges the space between said collecting tube and said receiving element.

5. Apparatus for measuring the liquid water content of clouds comprising a porous element adapted to collect any liquid water which it intercepts in passing through a cloud, a capillary tube attached at one end to said porous element and extending downward therefrom, whereby a head of water fills said capillary tube and applies a suction to said porous element so that excess water is drained from the porous element and collects as droplets on the lower end face of said capillary tube, the outer surface of said capillary tube being hydrophobic at the limiting edge of such end face, means including a receiving element having a hydrophilic surface spaced a fixed distance from the point at which said droplets being to form to draw each such droplet away from said capillary tube when said droplet has attained sufficient size to contact said receiving element, so that all such droplets attain a uniform size, and an electric voltage source in series with an electric indicator connected between said capillary tube and said receiving element so that a pulse of electric current flows through said indicator each time a droplet bridges the space between said capillary tube and said receiving element.

6. Apparatus for measuring the amount of suspended liquid in an aerosol comprising a porous element adapted to collect any liquid which it intercepts, means including a capillary tube to drain excess liquid from said porous element and to collect such liquid in the form of droplets at one end of said capillary tube, a receiving element spaced a fixed distance from the point at which such droplets begin to form, and means to draw each such droplet away from said capillary tube when said droplet has attained sufficient size to contact said receiving element so that all such droplets attain a uniform size.

VINCENT J. SCHAEFER.

REFERENCES CITED

The following references are of record in the file of this patent:

UNITED STATES PATENTS

| Number | Name | Date |
|---|---|---|
| 2,333,791 | Hutchison | Nov. 9, 1943 |
| 2,340,455 | Davis | Feb. 1, 1944 |